(12) United States Patent
Cogswell

(10) Patent No.: US 6,632,126 B1
(45) Date of Patent: Oct. 14, 2003

(54) BLADE RING SAW ASSEMBLY

(76) Inventor: Jesse G. Cogswell, 5403 Sunnyview St., Torrance, CA (US) 90505

( * ) Notice: Subject to any disclaimer, the term of this patent is extended or adjusted under 35 U.S.C. 154(b) by 0 days.

(21) Appl. No.: 09/913,214

(22) PCT Filed: Jan. 10, 2000

(86) PCT No.: PCT/US00/01374
§ 371 (c)(1),
(2), (4) Date: Aug. 8, 2001

(87) PCT Pub. No.: WO00/43175
PCT Pub. Date: Jul. 27, 2000

Related U.S. Application Data
(60) Provisional application No. 60/116,708, filed on Jan. 22, 1999.

(51) Int. Cl.[7] .................................................. B24B 1/00
(52) U.S. Cl. ..................... 451/178; 451/411; 125/13.01; 125/15; 83/477.2
(58) Field of Search ................................ 451/178, 231, 451/411, 412, 541; 125/13.01, 14, 15; 83/663, 676, 477.2

(56) References Cited

U.S. PATENT DOCUMENTS

| | | | |
|---|---|---|---|
| 4,424,649 A | * | 1/1984 | Vincent et al. .......... 125/13.01 |
| 4,436,078 A | * | 3/1984 | Bourke ....................... 125/13 |
| 4,576,139 A | | 3/1986 | Cogswell |
| 4,976,251 A | * | 12/1990 | Smith ....................... 125/13.01 |
| 5,964,210 A | * | 10/1999 | Hodsden ....................... 125/21 |
| 6,119,675 A | * | 9/2000 | Akram et al. ............. 125/23.01 |

* cited by examiner

Primary Examiner—Eileen P. Morgan

(57) ABSTRACT

The present invention relates to a blade ring saw assembly in which the blade is a narrow, flat-sided metal ring having a radial width at least twice, and preferably four to six times, its thickness and has a diamond abrasive coating covering its outer peripheral edge and a portion of each sidewall of the ring. The blade ring is supported on a base from beneath the working surface, and projects upwardly to expose more than one-half of the blade ring for cutting of hard and thick workpieces, such as tile and stone, including both curved cutting and straight cutting. The blade ring is supported beneath the work surface by a plurality of roller guides above its radially inner edge and an endless drive belt having a run that extends beneath the blade ring so as to both support and drive the blade ring. Side-motion inhibiting roller guides are positioned immediately beneath the primary cutting area, to restrict lateral displacement of the blade ring during cutting, and similar roller guides optionally are provided on a stabilizer arm over the blade ring, also having a wiper serving to block coolant carried by the blade ring from a reservoir in the base.

28 Claims, 4 Drawing Sheets

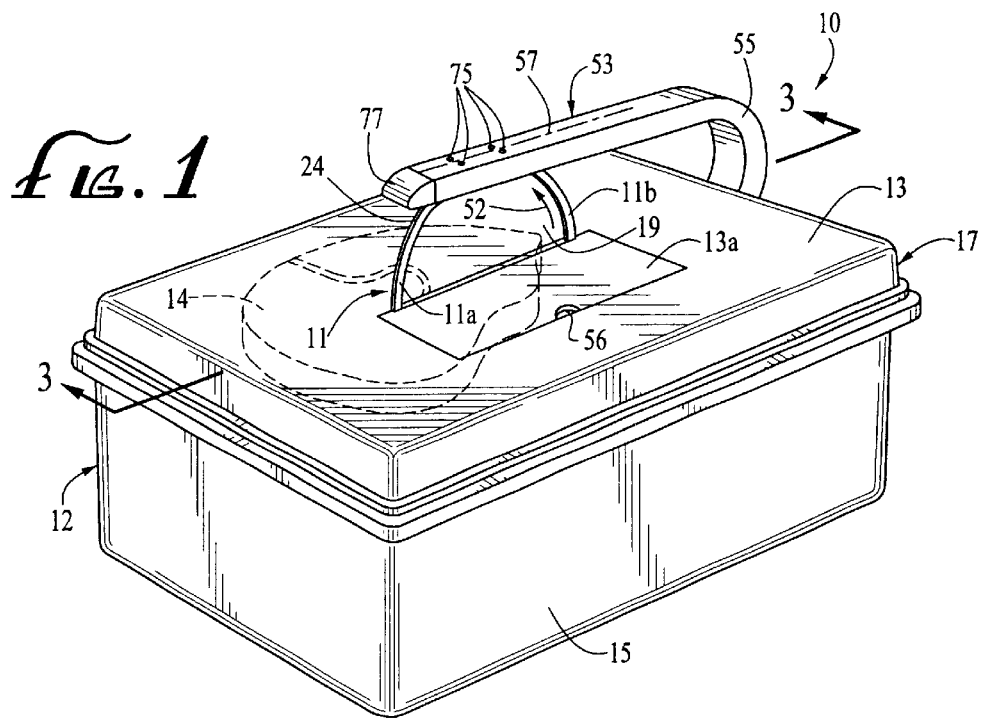
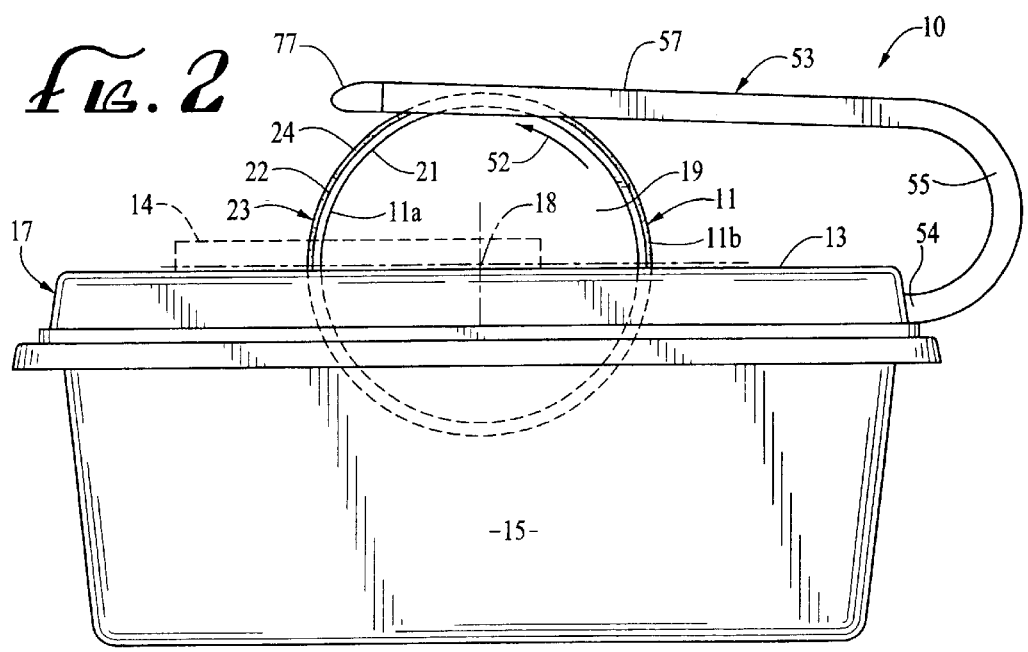

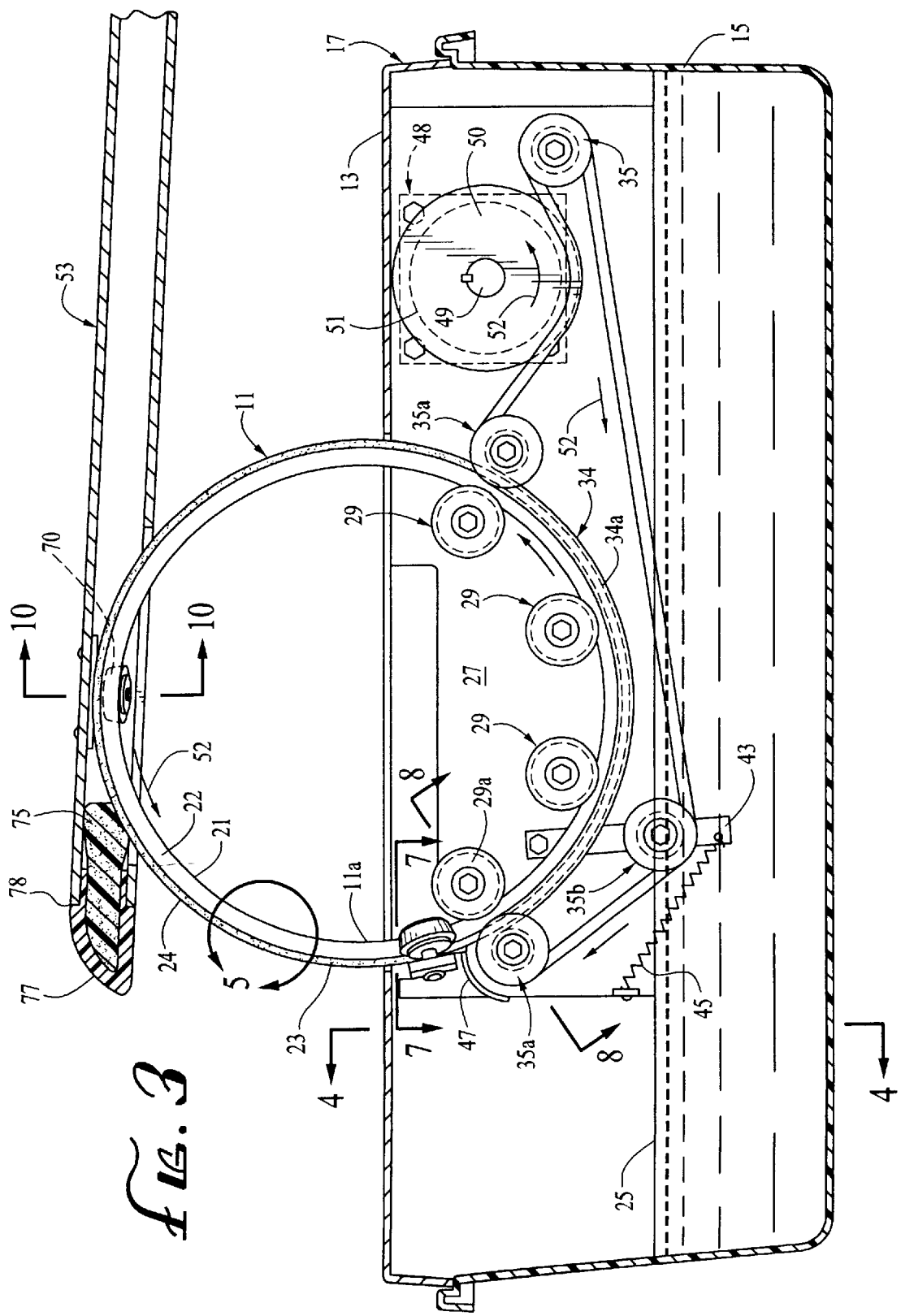

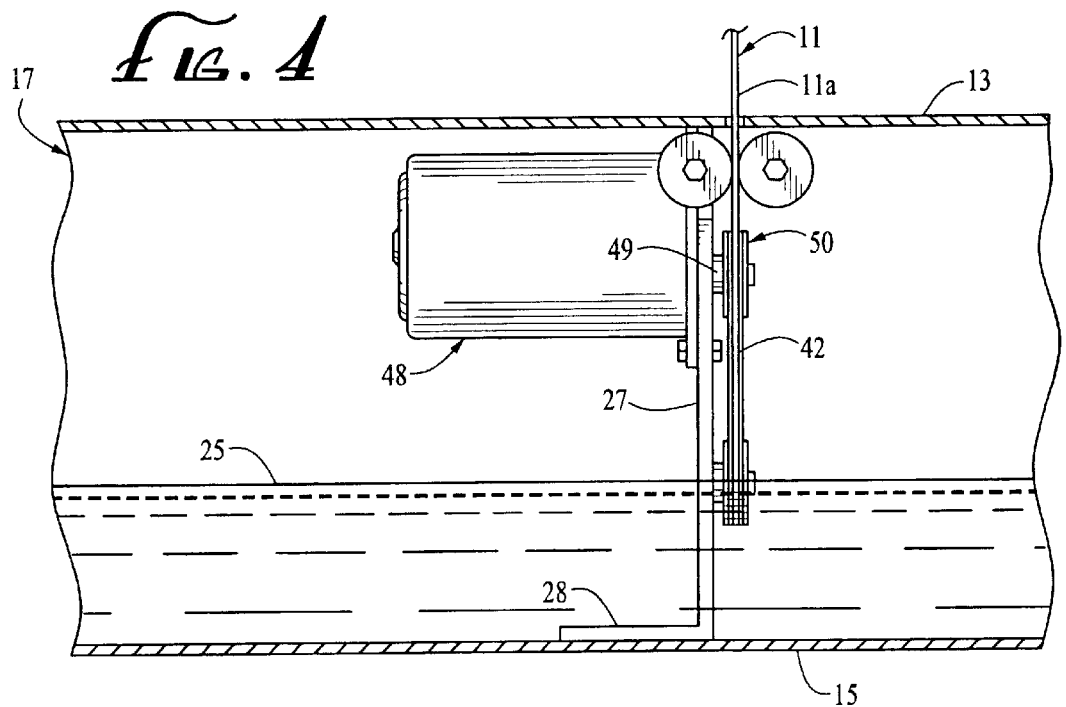
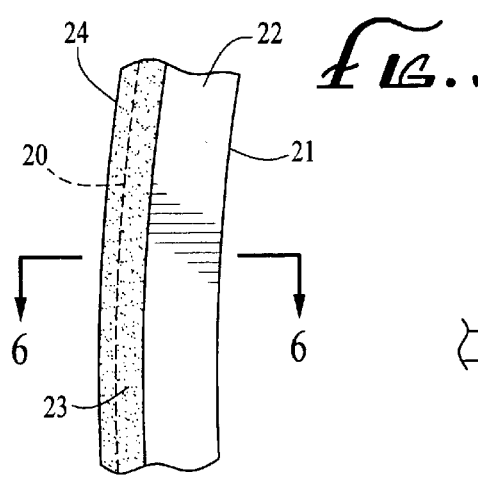
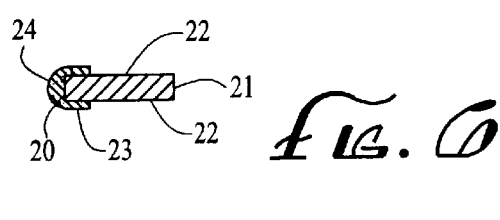
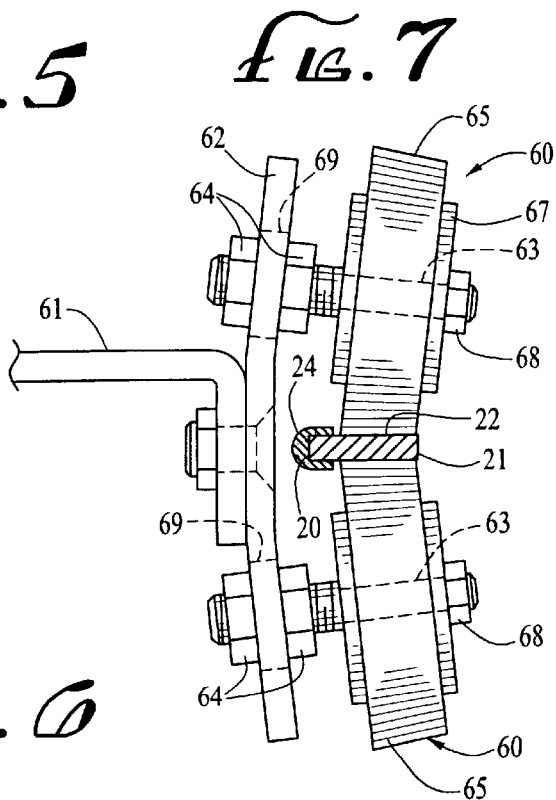

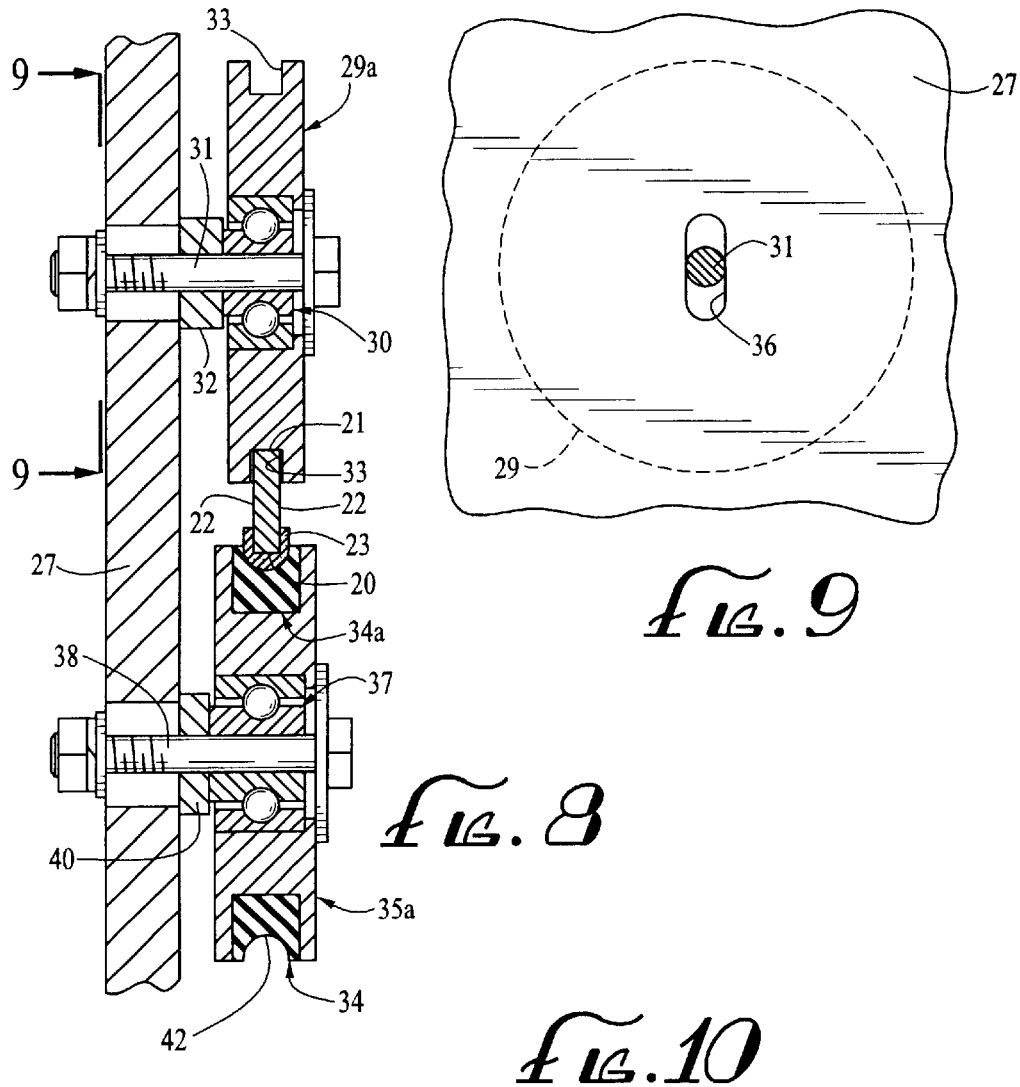
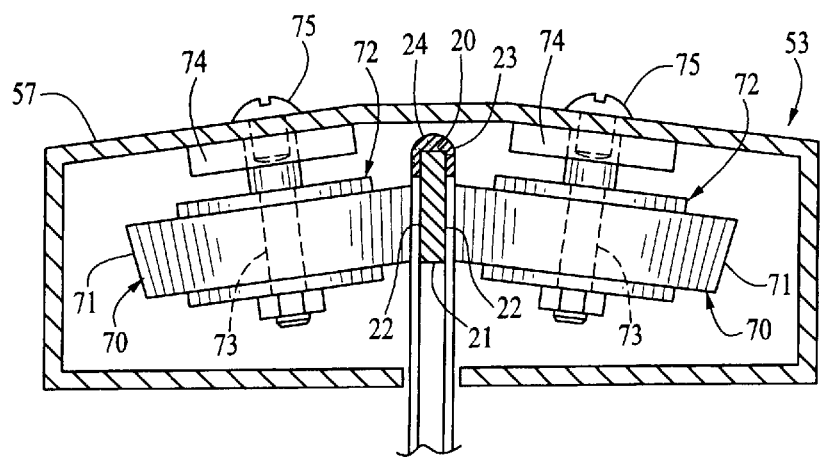

United States Patent …

BLADE RING SAW ASSEMBLY

TECHNICAL FIELD

This application claims priority based upon co-pending U.S. provisional application Ser. No. 60/116,708, filed Jan. 22, 1999, entitled Blade Ring Saw.

BACKGROUND ART

This invention relates to saws designed primarily, but not exclusively, for cutting very hard materials such as glass, tile, stone and the like, and has particular reference to so-called "ring saws" having a cutting tool or element in the form of a ring with an open center and supported on a base for rotation about a central axis.

Saws of this general type typically use cutting rings that are coated with an abrasive such as diamond particles, and have a work surface for supporting a workpiece to be cut as it is moved relative to the rotating ring into engagement with a working section of the ring where it passes through an opening in the work surface. A prior ring saw of this general type is shown in U.S. Pat. No. 4,576,139, which discloses a saw blade comprising a single strand of high tensile strength wire that is round in cross-section and is formed into a closed circular loop and covered with an abrasive coating so as to be equally capable of cutting in all directions. The ring is made as rigid as is possible with a wire of small diameter, usually less than one-quarter to one-half inch, and preferably about one-eighth inch in the commercial embodiment. The ring is supported and guided by the saw assembly around all of its circumference except for a short working section adjacent to the work surface where the cutting occurs. A frictional drive wheel rotates the ring at high speed. This patented saw has been very popular for use in cutting intricate shapes in materials like stained glass, but has limited capability for heavy work like cutting relatively thick pieces of file or stone, primarily because of the limited strength of the wire, particularly in small diameters desirable for fine cutting.

In one sense, the present invention is an improvement over the wire ring saw shown in the above-identified patent, and, in another sense, is a departure from blade and support concepts disclosed in that patent, so as to overcome the limitations of the wire ring saw with respect to heavy-duty cutting of relatively thick materials such as tile and stone while maintaining the ability to cut curves in such materials, and at the same time enhancing the capabilities of the saw in other respects.

SUMMARY OF THE INVENTION

For the foregoing purposes, the saw apparatus of this invention utilizes a blade ring that is not wire, but rather is a narrow flat-sided ring having sufficient radial width to be self-sustaining in shape during the cutting operations, permitting more than half of the ring blade to be exposed above the work surface and supported and driven in a novel fashion, that may be entirely beneath the work surface. This produces a blade ring of generally rectangular cross-section, having narrow inner and outer peripheral edges and relatively wide sidewalls, which should be at least twice the thickness of the outer peripheral edge. Typically, the blade ring is covered with an abrasive coating on the outer peripheral edge and at least partially on its sidewalls, for side-cutting. It is supported between guides engaging one of the peripheral edges, preferably the inner edge, along a substantial arc that may be entirely beneath the work surface, and by a drive element engaging the other peripheral edge, preferably the outer, and serving as a support for the blade ring as well, the preferred drive element being an endless belt having one run trained around a substantial arc along the underside of the blade ring, opposite the guides. The preferred guides are rollers rotatably mounted on the base and angularly spaced apart along the inner edge of the blade ring.

As is customary, a reservoir of liquid such as water for cooling the ring during cutting preferably is incorporated in the apparatus beneath the base, herein positioned so that the drive belt picks up coolant from the reservoir and carries it to the blade ring. Further, an optional stabilizer is provided for the upper portion of the blade ring with guides positioned on opposite sides of the blade ring to maintain the blade ring in its proper plane of operation. This is in the form of an arm overlying and tangent to the blade ring, and including a wiper for catching excess coolant carried by the blade ring.

Other aspects and advantages of the invention, including detailed aspects of the guides and drive, will become apparent from the following detailed description, taken in conjunction with the accompanying drawings, in which:

BRIEF DESCRIPTION OF THE DRAWINGS

FIG. 1 is a perspective view of a blade ring saw apparatus embodying the novel features of the present invention;

FIG. 2 is an enlarged fragmentary side elevational view taken from the right-hand side of FIG. 1;

FIG. 3 is an enlarged fragmentary cross-sectional view taken substantially along line 3—3 of FIG. 1;

FIG. 4 is a fragmentary cross-sectional view taken substantially along line 4—4 of FIG. 3;

FIG. 5 is an enlarged fragmentary side elevational view taken within the circle 5 of FIG. 3;

FIG. 6 is a cross-sectional view taken along line 6—6 of FIG. 5;

FIG. 7 is an enlarged fragmentary cross-sectional view taken along line 7—7 of FIG. 3;

FIG. 8 is an enlarged fragmentary cross-sectional view taken along line 8—8 of FIG. 3;

FIG. 9 is a fragmentary cross-sectional view taken along line 9—9 of FIG. 8; and FIG. 10 is an enlarged fragmentary cross-sectional view taken along line 10—10 of FIG. 3.

DETAILED DESCRIPTION OF THE PREFERRED EMBODIMENT

As shown in the drawings for purposes of illustration, the invention is embodied in a ring saw assembly, indicated generally by the reference number 10 in FIGS. 1 and 2, having a circular saw blade 11 in the shape of a ring having an open center and supported on a base 12 forming a work surface 13 for a workpiece to be cut, a representative workpiece being shown in broken lines at 14 in FIGS. 1 and 2. The base 10 includes a reservoir 15 for coolant for the saw blade 11, herein in the form of a tub that forms a structural part of the base, and a flanged cover 17 for the tub having a flat top forming the work surface 13. In use, the entire saw assembly typically is supported on a simple stand or table (not shown).

In ring saws of this general type, including the saw of the above-identified patent, the saw blade 11 is rotated at high speed about an axis (indicated at 18 in FIG. 2) at the center of the circular blade, and is supported on the base 12 so that the blade remains in a preselected working position during such rotation. One of the important advantages of ring saws is the ability to cut along curves, permitted by the open center of the blade, this being indicated at 19 in FIGS. 1 and 2. The body of the workpiece is moved through the open center to pass the working section of the saw, indicated at 11a, along the desired path relative to the workpiece.

As mentioned in the "Background", the wire blade of the patented saw assembly requires support around substantially its entire periphery, except for a short working section adjacent to the work surface where the blade engages the workpiece being cut. In accordance with the present invention, the blade ring 11 is not a wire, but instead has an annular body of substantial radial width that is self-supporting under the forces created in normal sawing operations, and is supported and driven along a limited length of the ring, herein by guides 29 and a drive element 34 disposed below the work surface 13 and permitting much greater portion of the ring to be exposed above the work surface and available for use in cutting. In addition, the blade ring is usable for straight cutting as well as for curves.

To these ends, the blade ring 11 is an annular metal bar in a ring shape, having narrow outer and inner peripheral edges 20 and 21 and opposite sidewalls 22 having a radial width that is substantially greater than the thickness of the ring so that the cross-sectional shape of the ring is substantially rectangular. The width should be at least twice the thickness, and preferably is several times the thickness for strength, while being narrow enough to permit cutting of curves and to leave a substantial central opening 19 for movement of the workpiece.

The primary cutting with the blade ring 11 is performed by an abrasive coating 23 (see FIG. 5) that covers the outer peripheral edge 20 of the ring and forms a peripheral cutting edge 24, the coating also extending at least partially over the sidewalls 22 from the outer edge, as shown in FIGS. 2, 3 and 5. The abrasive coating may be composed of various well known abrasives, some of which are referred to as "super" abrasives, including diamond particles, cubic boron nitride and others, the presently preferred abrasive being 60/80 diamond grit. It will be apparent that the width of the saw "cut", or "kerf", is determined by the combined thickness of the ring and the two layers of abrasive on the sidewalls.

While the blade ring may be made in a wide range of sizes, a typical and representative embodiment has a ten-inch outside diameter and a three-eighths inch radial width, and a ring thickness of approximately one-sixteenth inch uncoated and slightly thicker when coated. The blade may be sintered or electroplated, the latter providing a layer of diamond grit adhered to the metal ring by electroplated nickel.

As shown most clearly in FIG. 3, the guides and the drive element for the blade ring 11 herein are mounted entirely below the work surface 13 in engagement with the lower portion of the blade ring, in the space in the reservoir tub 15 above the normal level 25 of the coolant therein. For this purpose, a generally rectangular mounting plate 27 (see FIG. 4) is attached to the underside of the flanged cover 17 and extends downward to the bottom of the tub, in a vertical plane positioned alongside the plane of the working position of the blade ring. A foot 28 on the lower edge of the mounting plate engages the bottom of the tub, for firm support, and the guides are supported on this plate, in the plane of the working position of the blade ring. A plurality of such guides, which herein are peripherally grooved rollers or grommets 29 as shown in FIG. 8, preferably mounted by ball bearings 30 on axles 31 secured to the mounting plate 27 and held in the desired plane by spacers 32 on the axles, which are the elongated stems of bolts, as shown in FIG. 8. Four such roller guides 29 are angularly spaced apart along the portion of the blade ring that is below the work surface 13, along an arc of approximately one hundred and fifty degrees in the preferred embodiment. As shown in FIG. 8, a peripheral groove 33 in each of these roller guides is shaped to receive the inner peripheral edge portion of the blade ring with a close fit.

Because the greatest displacement forces are applied to the blade ring 11 in the area of the working section 11a, where the workpieces are primarily engaged, two side-motion inhibiting guides, also in the form of rollers 60, are positioned against the blade ring just below the work surface 13 where the blade ring passes through. These rollers, shown most clearly in FIGS. 3 and 7, are mounted on a bracket 61 carrying a T-bar 62 to which end-threaded stud axles 63 are secured by nuts 64, with the axles generally (but not precisely) parallel to the plane of the blade ring, as can be seen in FIG. 7. In fact, the axles are inclined slightly outwardly away from the blade ring, and the rollers 60 are frustro-conical in shape, with their tapering side surfaces 65 disposed flat against the sidewalls 22 of the blade ring for secure support. These rollers also are mounted on ball bearings indicated at 67, for smooth, substantially friction-free operation, and are held on the stud axles by nuts 68. The axles can be adjustably mounted on the T-bar in slots 69 therein, indicated in broken lines, for selective movement into proper positions alongside the blade ring—light touching, rather than heavy pressure, being the optimum condition.

Similarly, the drive element 34, herein an endless drive belt, is supported on the mounting plate 27 and is disposed beneath the working position of the blade ring 11, and is trained around a plurality of pulleys 35 that determine the path of the belt, including an arcuate run 34a along the underside of the working position of the blade ring. This run supports and drives the ring for the cutting operations. As can be seen in FIG. 3, one pulley 35a is positioned at each end of this run, preferably opposite the highest roller guides 29a. As shown in FIG. 8, the pulleys are mounted on the plate 27 on ball bearings 37 on bolts that form axles 38 for the pulleys, in a manner similar to the roller guides 29. Spacers 40 hold the pulleys in centered relation with the plane of the working position of the blade ring 11, and the pulleys have peripheral grooves shaped to receive the endless drive belt 34 with a close fit. The drive belt 34 also has a groove 42 in its outside surface, the upper surface of the lower run 34a, for receiving the outer peripheral portion of the blade ring in "nested" relation, as shown in FIGS. 3 and 8, thereby providing firm driving engagement with the blade ring. When the blade ring is seated or nested in the belt and the belt is rounding the pulley 35a, the condition is as shown in FIG. 8. FIG. 9 shows an adjustment slot 36 in the plate 27 which permits the roller guide 29 to be positioned for optimum adjustment when the axle bolt is loose. Movement of the axle 31 along the slot 36 positions the roller guide 29a relative to the pulley 35a.

The endless drive belt 34 is maintained at proper tension by a tensioning pulley 35b, shown in FIG. 3, rotatably mounted on an arm and urged yieldably downwardly by a coiled tension spring 45 that applies the desired tensioning force. This arm also holds the pulley 34b below the coolant level 25 to cause the belt to pick up coolant for the blade ring 11. A baffle 47 deflects excess coolant back into the reservoir.

To drive the endless belt 34, a drive motor 48 (FIG. 4) is mounted on the plate 27, on the side opposite from the belt, with its drive shaft 49 extending through the plate and carrying a drive pulley 50. This wheel has a peripheral groove 51 (FIG. 3) in which the drive belt is frictionally engaged, so that rotation of the pulley 50 by the motor 48 drives the blade ring. The directions of rotation and belt movement are indicated by the arrows 52 in FIGS. 2 and 3.

To permit access to the working parts of the saw assembly 10 through the working surface 13 of the cover 17, the cover has a trap door 13a alongside the working position of the blade ring 11, and defining a slot through which the blade ring projects. The trap door 13a constitutes part of the working surface 13 and is removable by means of a finger hole 56, when access to the interior of the tub 15 is needed.

An important advantage of ring saws is the very effective utilization of available motor power, achieved through driving the ring from its outer periphery rather than from the center. Whereas a conventional rotary saw driven from its center loses power not only in stepping up the RPM but also because the power is applied at a distance from the load (where the cut is made) equal to the radius of the blade. In contrast, the ring saw delivers the full horsepower of the motor to the outer peripheral edge of the ring where the ring is driven. Thus, the motor may be a ⅓ horse power electric motor, which produces greater usable power in a ring saw than is produced by, for example, a one-horsepower motor geared up at a 3-to-1 ratio and driving a conventional ten-inch diameter saw blade from its center. Further, the support of the blade ring 11 on the drive belt, which is a rubber or rubber-like composition, produces smoother blade operation than an axle-mounted saw. This results in a smoother cutting action in very hard materials.

While the previously described guide and support elements 29 and 34 are capable of supporting and driving the blade ring 11 without any additional support above the work surface 13, it is possible in applying cutting pressure to deflect the saw laterally from its properly centered position, and thereby to adversely affect the cut. To resist such lateral deflection in use, a stabilizer 53 in the form of an arm overlying and generally tangent to the ring blade, at its top, is provided on the base 12, as best shown in FIGS. 1 and 2. This arm herein is J-shaped, having a lower end at 54 secured to the rear edge of the cover 17, and preferably also to the mounting plate 27 for firm support, an upward curve 55, and a hollow free end portion 57 constituting the stabilizer arm.

As shown in FIGS. 3 and 10, two stabilizer rollers 70, similar to the rollers 60 shown in FIG. 7, are mounted in the stabilizer arm for the same side-motion inhibiting action with respect to the top of the blade ring 11. These rollers may be identical in configuration to the rollers 60, having frustro-conical bodies with tapered side surfaces 71, and ball-bearing mounts 72 on upwardly and outwardly inclined axles 73. The axles are adjustably supported on pivot bars 74 which are held in the stabilizer arm by releasable fasteners, herein screws 75. When the screws are loosened, the pivot bars are movable to swing the rollers toward or away from the sidewalls 22 of the blade ring and when the screws are tightened, the pivot bars and the rollers are held securely in the selected position. Again, the rollers should be adjusted into light touching engagement with the sidewalls, so as to be positioned to resist lateral displacement.

Mounted in the free end of the stabilizer 53 is a wiper 75 for blocking much of the coolant carried by the blade ring 11, primarily to prevent this coolant from being thrown at the operator. This wiper may be simply a replaceable sponge fitted into the closed end 77 of the arm in front of the blade ring, as shown in FIG. 3. The end of the arm may be separable at a joint 78 for easy replacement of the sponge.

As has been mentioned, the presently preferred blade ring 11 is a ten-inch diameter ring with flat sidewalls 22 that are about three-eighths (0.375) inch in radial width and 1/16 (0.063) inch thick. The commercial embodiment of the blade ring has a coated outer peripheral portion that is about 0.20 inch in radial width and between 5/64 (0.078) and 3/32 (0.094) in thickness. This leaves less than about 3/16 (0.188) of the sidewalls uncoated. It is to be understood that these dimensions are only one specific illustrative embodiment, and are not to be regarded as critical or limiting in any way.

In cutting a workpiece with the blade ring saw apparatus 10 of the invention, the drive motor 48 is started and begins to drive the drive belt 34, thus turning the blade ring 11 in the direction of the arrows in FIGS. 1 and 2 preparatory to engagement with a workpiece, such as the flat piece 14 of stone shown in FIGS. 1 and 2. It is to be noted that the workpiece may be as thick as the space between the stabilizer arm 57 and the work surface 13, which is almost five inches in the illustrative embodiment.

The workpiece 14 is moved relative to the ring blade 11 (note that the base can be made movable and the work stationary) to move the ring blade into and through the work. The permissible amount of pressure is far greater than with a wire ring as the cutting element, and will vary with the hardness and thickness of the workpiece. In each case, the permissible speed of cut is much greater than with a wire blade.

To produce a curved cut as shown in FIG. 1, the workpiece is turned relative to the blade ring as it is advanced, the permissible amount of turning being determined by the radial width of the blade and the width of the saw kerf. The curves shown in FIG. 1 are representative of what can be achieved with a blade ring dimensioned as herein described as the commercial embodiment.

It is important to note that a straight cut may be made with this saw apparatus, simply aligning the saw kerf with the rear portion 11b of the blade ring as the cut is made. These curves cannot be as severe as can be made with a wire blade of the same thickness, but generally will serve the needs of a commercial tile or stone cutter. Further, angle cuts such as miter joints may be made by tilting the workpiece to the desired angle during the cut. A suitable fixture such as an angled rail or so-called "fence" (not shown) can be added for this purpose. These expedients make the blade ring saw apparatus more widely useful for tile and stone cutters.

From the foregoing detailed description, it will be evident that the blade ring saw apparatus of the present invention provides a novel and very effective cutting tool for hard materials, and is capable not only of curved cutting of such materials but also of doing so in a much faster and smoother way than with prior ring saws. It also will be evident that, while a specific preferred embodiment has been illustrated and described in detail, various modifications and changes may be made by those skilled in the art without departing from the spirit and scope of the invention.

What is claimed is:

1. A blade ring saw assembly, comprising:
   a blade ring having an annular metal body with a narrow outer peripheral edge, substantially flat sidewalls and an inner edge defining an open central portion, and an abrasive coating on said peripheral edge and at least a portion of each of said flat sidewalls along said edge;

a base having a substantially flat and normally horizontal work surface for supporting a workpiece to be sawed and having an opening for said blade ring, said blade ring being disposed in said opening in a plane perpendicular to said work surface in a predetermined normally vertical working position, with approximately one-half of the blade ring above the surface and the remainder of the blade ring disposed beneath the work surface;

an endless drive belt mounted on said base below said work surface and having one run extending around a portion of the underside of the blade ring entirely beneath said work surface;

a plurality of pulleys supporting said drive belt and training said one run against the lower portion of said blade ring;

a plurality of roller guides rotatably supported on said base beneath said work surface and positioned to guide said blade ring in said working position and to cooperate with said drive belt in supporting the blade ring rotatably on said base;

means for driving said drive belt and thereby rotating said blade ring about a predetermined axis extending through said open central portion of said blade ring;

and a reservoir beneath said base for holding a quantity of coolant for engagement with a lower portion of the belt and thus with the blade ring.

2. A saw assembly as defined in claim 1 further including a stabilizer supported on said base and extending over the upper portion of said blade ring, said stabilizer having guide means thereon for engaging said sidewalls and resisting displacement of the blade ring from said working position during rotation.

3. A saw assembly as defined in claim 1 wherein said stabilizer is an arm secured at one end to said base and extending over said blade ring, and said guide means are a pair of roller guides positioned on opposite sides of said ring body and rotatably mounted on said arm to turn about upright axes extending substantially radially of the blade ring with peripheral surfaces of the roller guides in rolling engagement with said sidewalls.

4. A saw assembly as defined in claim 3 wherein said axes are inclined upwardly and away from said working position and said roller guides on said stabilizer arm are frustro-conical in shape and are mounted on the arm for adjustment into light guiding engagement with said sidewalls.

5. A saw assembly as defined in claim 2 wherein said stabilizer has a wiper beside said blade ring to catch coolant thrown off from the blade ring.

6. A saw assembly as defined in claim 5 wherein said stabilizer is an arm supported on said base and substantially parallel to said work surface above said working position of said blade ring, and said wiper is a sponge mounted on said arm alongside said ring body.

7. A saw assembly as defined in claim 1 in which said plurality of roller guides beneath said work surface are positioned above said lower portion and have grooved peripheries in rolling engagement with said inner edge.

8. A saw assembly as defined in claim 7 in which said roller guides beneath said work surface also include at least one pair of opposed side-motion inhibiting roller guides disposed on opposite sides of the blade ring closely adjacent to the work surface to stabilize the blade ring while cutting a workpiece.

9. A saw assembly as defined in claim 8 wherein the last-mentioned opposed roller guides are rotatably mounted on said base to rotate about generally horizontal axes extending substantially radially of the blade ring beneath the work surface with peripheral surfaces of the roller guides in rolling engagement with said sidewalls.

10. A saw assembly as defined in claim 9 wherein said axes are inclined radially outwardly and away from said working position and said guide rollers are frustro-conical in shape and are supported on the base for adjustment into light guiding engagement with said sidewalls.

11. A saw assembly as defined in claim 7 wherein said roller guides and said pulleys include one pulley beneath said belt at each end of said one run and a roller guide in direct opposition to each of them above said blade ring, and at least one additional roller guide above said blade ring.

12. A saw assembly as defined in claim 1 wherein said pulleys include one drive pulley, and further including a selectively operable drive motor drivingly coupled to said drive pulley.

13. A saw assembly as defined in claim 1 wherein said pulleys include a tensioning pulley movably mounted on said base in engagement with said endless belt on a portion thereof remote from said one run, and means for applying selected tensioning force to the belt through said tensioning pulley.

14. A saw assembly as defined in claim 13 wherein said tensioning pulley is rotatably mounted on an arm that is pivoted on said base for swinging of said pulley downward toward said remote run, and normally is positioned to hold said remote run below the coolant level in said reservoir.

15. A saw assembly as defined in claim 1 wherein said base comprises a cover having a flat top forming said work surface, a tub beneath said cover forming said reservoir, and a mounting plate depending from said cover alongside said working position of said blade ring and carrying said pulleys and said roller guides.

16. A blade ring saw assembly capable of cutting a curve in a workpiece, comprising:

an annular blade ring having an annular body with a narrow outer peripheral edge, substantially flat sidewalls, and an inner edge defining an open central portion for permitting a portion of the workpiece to pass through the blade ring, and an abrasive coating on said outer peripheral edge and at least a portion of each of said sidewalls;

a base having a work surface adapted to be horizontally positioned for supporting a workpiece to be sawed, and having an opening for said blade ring, said blade ring being disposed in said opening with substantial portions of the blade ring and said open central portion disposed above the work surface in a predetermined working position and with the remainder of the blade ring disposed beneath the work surface;

guide means disposed both above and below the portion of the blade ring beneath the work surface to support the blade ring in the working position while permitting it to rotate about a predetermined axis relative to the base;

and means for driving the blade ring about said axis for cutting of the workpiece, whereby the workpiece can be turned during cutting to pass a portion of the workpiece through said open central portion to cut a curve in the workpiece.

17. A blade ring saw assembly as defined in claim 16 wherein said guide means include an endless belt having a run extending beneath with the blade ring, and said means for driving the blade ring comprise a drive motor drivingly coupled to said endless belt.

18. A blade ring saw assembly as defined in claim 16 wherein more than one-half the periphery of said blade ring is above said work surface.

19. A blade ring saw assembly as defined in claim 16 further including a stabilizer mounted on said base and extending generally tangentially across the blade ring above the work surface, said stabilizer having a pair of roller guides disposed on opposite sides of the blade ring to resist lateral movement of the blade ring out of the working position.

20. A blade ring saw assembly as defined in claim 16 further including a reservoir disposed beneath the work surface to hold coolant for cooling said blade ring.

21. A blade ring saw comprising:

an annular blade ring having a ring-shaped body with a narrow outer peripheral edge, substantially flat sidewalls, and an inner edge defining an open central portion comprising more than one-half of the diameter of the blade ring, and an abrasive coating on said peripheral edge and a portion of each of said sidewalls along said outer peripheral edge, wherein said sidewalls have a radial width at least twice and not more than ten times the thickness of said body.

22. A blade ring saw as defined in claim 21 wherein said sidewalls have a radial width at least twice the thickness of said body.

23. A blade ring saw as defined in claim 21 wherein said body has a thickness in the range of approximately one-sixteenth inch to one-eighth inch, a diameter in the range of six to twelve inches, and a radial width in the range of one-quarter inch to five-eighths inch.

24. A blade ring saw as defined in claim 21 wherein said body has a thickness of approximately one-sixteenth inch, a diameter in the range of six to twelve inches and a radial width of approximately three-eighths inch.

25. A blade ring saw assembly capable of cutting a curve in a workpiece, comprising:

an annular blade ring having an annular body, a narrow outer peripheral edge, an inner edge defining an open central portion of said ring for permitting a portion of a workpiece to pass through the ring, and an abrasive coating on the outer peripheral portion of the body;

a base having a work surface for supporting a workpiece to be sawed on one side of the work surface and having an opening for said blade ring;

means for supporting said blade ring in a cutting position projecting outwardly through said opening and away from said one side of the work surface with part of the blade ring disposed on the other side of the work surface and with a substantial part of said central opening disposed on said one side of said work surface and remaining open to provide clearance for the workpiece to pass through during cutting, said supporting means being disposed on said other side of said work surface;

and a drive member for rotating said blade ring in said cutting position.

26. A blade ring saw assembly as defined in claim 25 wherein said drive member is an endless drive belt having one run of the belt extending along the side of the blade ring in the cutting position remote from the work surface, and supporting and engaging said outer peripheral edge, and a motor drivingly engaging said endless belt.

27. A blade ring saw assembly as defined in claim 26 wherein said supporting and rotating means include a plurality of roller guides spaced apart along and engaging said inner edge, in opposed relation with said one run.

28. A blade ring saw assembly as defined in claim 25 further including a stabilizer spaced from the work surface on said one side thereof, generally tangent to the blade ring, and having means thereon for limiting lateral motion of the blade ring.

* * * * *